(12) United States Patent
Tejada et al.

(10) Patent No.: US 6,747,256 B1
(45) Date of Patent: Jun. 8, 2004

(54) SYSTEM AND METHOD FOR OPTICAL ALIGNMENT OF A COLOR IMAGING SYSTEM

(75) Inventors: John Anthony Tejada, Londonderry, NH (US); Joseph F. Borchard, McKinney, TX (US); Erwin Cooper, Valley View, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/108,731

(22) Filed: Mar. 27, 2002

(51) Int. Cl.$^7$ .................................................. G01J 1/20
(52) U.S. Cl. ................. 250/201.1; 356/153; 250/504 R
(58) Field of Search ..................... 250/201.1, 504 R, 250/495, 330, 208.1, 342, 559.29, 589.3, 203.1–203.3, 226, 214 VT, 338.1, 339.11, 339.14, 483.1; 273/348.1; 356/241.1, 241.2, 153, 399–400, 139.04–139.08, 51

(56) References Cited

U.S. PATENT DOCUMENTS

| | | | | |
|---|---|---|---|---|
| 4,087,689 A | * | 5/1978 | Asawa ........................ | 250/342 |
| 4,139,769 A | * | 2/1979 | McCrum et al. ......... | 250/341.8 |
| 4,260,254 A | * | 4/1981 | Braun ........................ | 356/154 |
| 4,422,758 A | * | 12/1983 | Godfrey et al. .......... | 356/152.1 |
| 5,025,149 A | * | 6/1991 | Hatfield, Jr. ................ | 250/342 |
| 5,047,638 A | * | 9/1991 | Cameron et al. .......... | 250/330 |
| 5,838,014 A | * | 11/1998 | Cabib et al. ............. | 250/504 R |
| 6,072,572 A | * | 6/2000 | Hatfield et al. .......... | 356/152.3 |

* cited by examiner

Primary Examiner—David Porta
Assistant Examiner—Patrick J. Lee
(74) Attorney, Agent, or Firm—Baker Botts L.L.P.

(57) ABSTRACT

A system and method for optical alignment of a color imaging system includes illuminating a target plate with a laser beam. Photo-luminescent energy from the target plate is emitted in response to the laser beam. A color imaging system is aligned based on the photo-luminescent energy emitted at the target plate.

34 Claims, 3 Drawing Sheets

SYSTEM AND METHOD FOR OPTICAL ALIGNMENT OF A COLOR IMAGING SYSTEM

GOVERNMENT CONTRACT

This invention was made in part with United States Government support under Contract No. N00164-99-D-0008-0005 awarded by the United States Navy, and the United States Government may have certain rights in the invention.

TECHNICAL FIELD OF THE INVENTION

This invention relates in general to laser targeting systems, and more particularly relates to a system and method for optical alignment of a color imaging system to a laser.

BACKGROUND OF THE INVENTION

Multi-spectral sensor/laser systems are generally used to track and record targets and include laser-guided weapons systems and nighttime imaging/tracking systems. A common process used to align sensors in the multi-spectral sensor/laser system includes viewing a target through a boresight module at an image plane of a boresight collimator within the boresight module. The target is viewed simultaneously by all of the sensors to eliminate error in alignment that can occur when the target is viewed by different sensors at different times.

In the past, aligning multi-spectral sensors was accomplished by illuminating a target with a laser and viewing the target with the forward looking infrared (FLIR) sensor and a vidicon camera sensor that operates in the near infrared (NIR), i.e., 700 nm to 950 nm spectral region. Most multi-spectral sensor systems used a vidicon (or NIR) camera in conjunction with a color camera for the dual purpose of obtaining NIR spectral information and allowing boresight transfer to the color camera. An NIR camera can detect laser energy reflected off the target, while the FLIR sensor detects the infrared energy emitted by the heated target. But color cameras come with bandpass filters on the detector to obtain a photopic spectral response. The color cameras, therefore, cannot detect the reflected infrared energy. Without the NIR camera, the color CCD camera is unable to be passively aligned.

SUMMARY OF THE INVENTION

In accordance with one embodiment of the present invention, a method for optical alignment of a color imaging system includes illuminating a target plate with a laser beam. Photo-luminescent energy from the target plate is emitted in response to the laser beam. A color imaging system is aligned based on the photo-luminescent energy emitted at the target plate.

Technical advantages of one or more embodiments of the present invention include transmitting the laser energy to an absorptive second target plate directly behind a first target plate operable to emit photo-luminescent energy. Thus, after the laser fires a beam into the boresight module, the color CCD camera is aligned on the visible glow from the first target plate, while the FLIR sensor boresights on the second laser-heated target material behind the first target plate. Thus, these two independent sensors operating at different spectral regions may then be aligned simultaneously to establish a common line-of-sight.

Further advantages include allowing the use of one set of projecting optics to be used when boresighting the entire sensor suite instead of projecting a target from two different sets of optics. Therefore, the boresight errors that manifest themselves over temperature and other environmental perturbations are eliminated. Also, this invention eliminates the use of a NIR camera because the color CCD camera can view the photo-luminescent glow directly from the first target plate in the boresight target.

These and elsewhere described technical advantages may be present in some, none, or all of the embodiments of the present invention. In addition, other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF EXAMPLE EMBODIMENTS OF THE INVENTION

Figure 1:
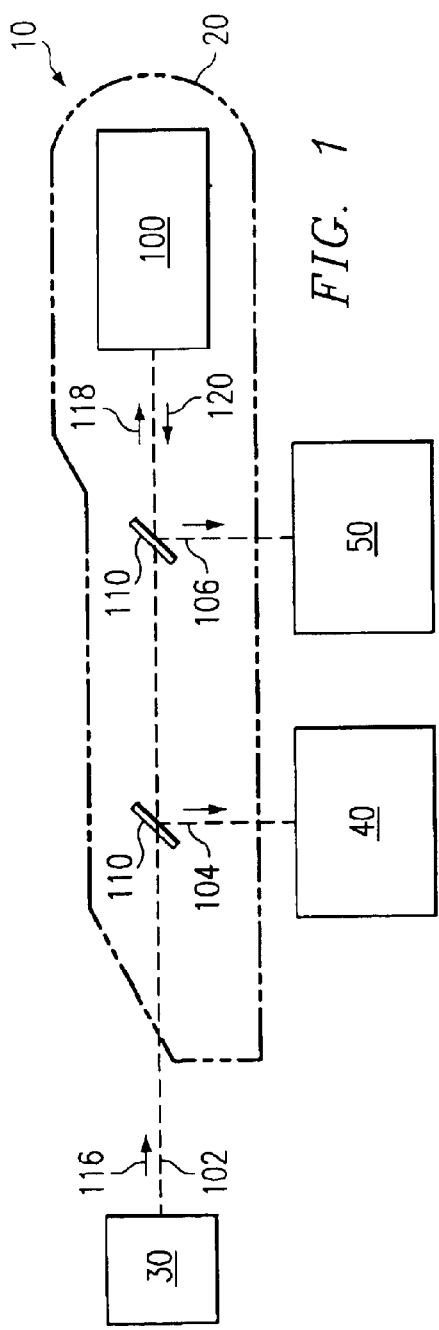
FIG. 1 is a block diagram illustrating a multi-spectral sensor/laser system in accordance with one embodiment of the present invention.

FIG. 1 illustrates a multi-spectral sensor/laser system 10 in accordance with one embodiment of the present invention. In this embodiment, multi-spectral sensor/laser system 10 includes a laser 30, a forward looking infrared (FLIR) sensor 50, a color charge-coupled device (CCD) camera 40, and a boresight module 20.

As used herein, "laser" refers to "l(ight) a(mplification by) s(timulated) e(mission of) r(adiation)" and products incorporating such a method. In one embodiment, laser 30 may be a YAG (Yttrium Aluminum Garnet) laser irradiating at approximately 1.064 microns; however, any type of laser used in multi-spectral sensor/laser systems may be used. FLIR sensor 50 may be a two-dimensional staring array infrared detector; however, any type of FLIR sensor used in multi-spectral sensor/laser systems may be used. Color CCD camera 40 may be any color imaging device or charge-coupled device with a bandpass filter able to obtain a photoptic spectral response. Boresight module 20 may be any sub-system used to align laser 30 with FLIR sensor 50 and color CCD camera 40.

Laser 30, FLIR sensor 50, color CCD camera 40, and boresight module 20 are optically connected through reflectors and beamsplitters 110. Laser 30, FLIR sensor 50, color CCD camera 40, and boresight module 20 may further be physically coupled to one or all of the other components. A plurality of channels 102, 104, and 106 are paths over which various forms of energy may travel. Channels 102, 104, and 106 may represent one or a plurality of physical conduits, including waveguides or simply vacant space.

In operation of one embodiment of the present invention, energy emanating from laser 30 travels over channel 102 to boresight module 20, as denoted by reference numeral 116.

Boresight module 20 processes laser 30 energy as described in more detail by FIGS. 2 and 3A through 3C. After processing, photo-luminescent energy is transmitted from boresight module 20 through channel 104 to color CCD camera 40, and infrared energy is transmitted from boresight module 20 through channel 106 to FLIR sensor 50. Color CCD camera 40 receives the photo-luminescent energy transmitted over channel 104 and is consequently aligned based on the photo-luminescent energy. FLIR sensor 50 is aligned using the emitted infrared energy received over channel 106. Such alignment may occur according to conventional techniques for aligning sensors using a boresight module.

Figure 2:
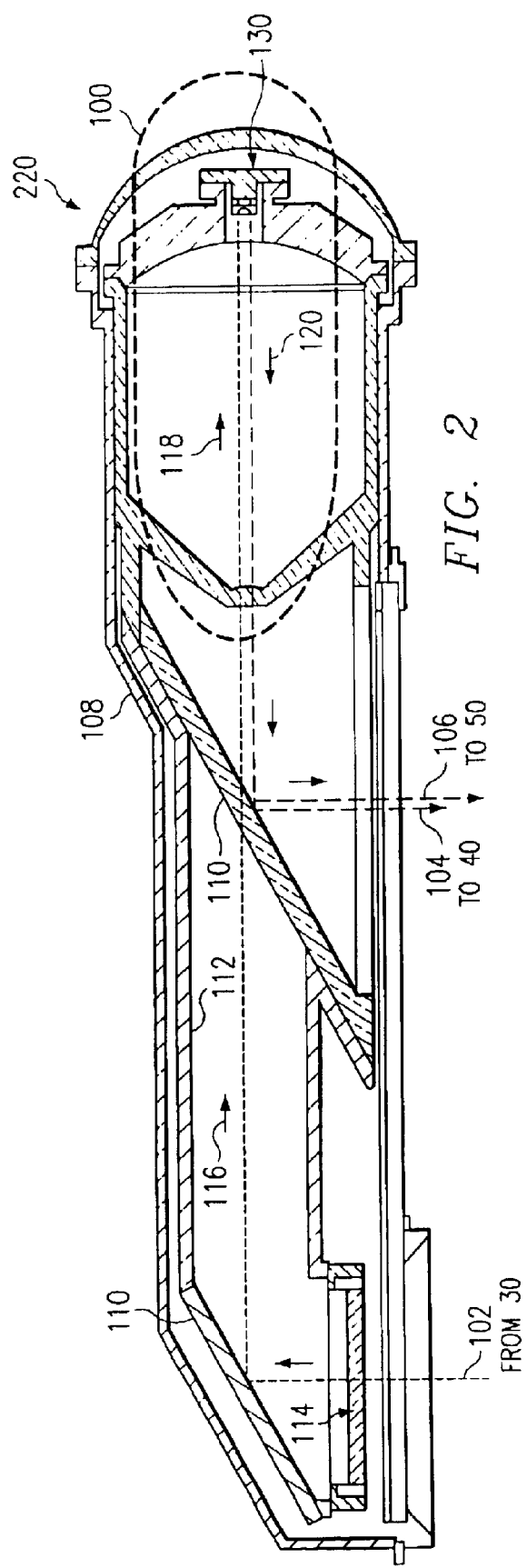
FIG. 2 illustrates the Foresight module of FIG. 1 with a second target plate in accordance with one embodiment of the present invention.
Figure 3A:
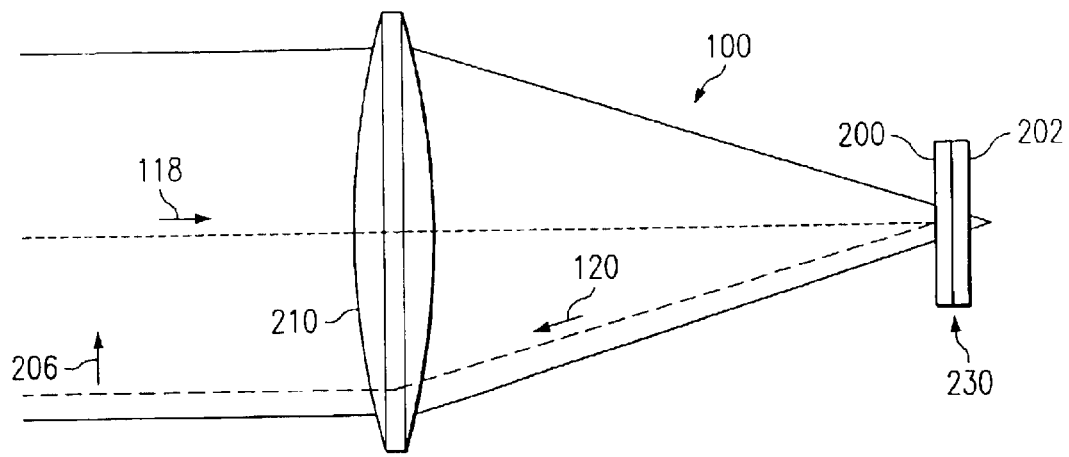
FIGS. 3A through 3C illustrate the optics of the target plates in accordance with various embodiments of the present invention.
Figure 3B:
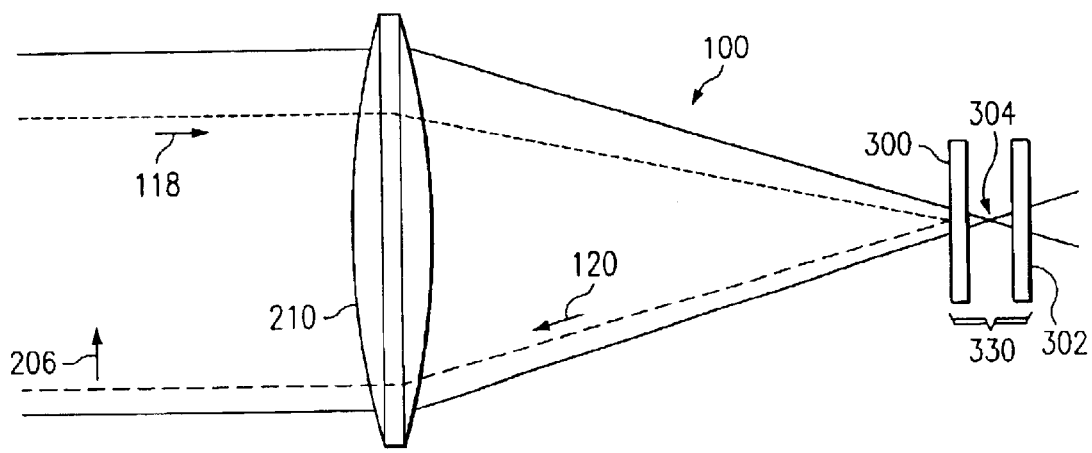
Figure 3C:
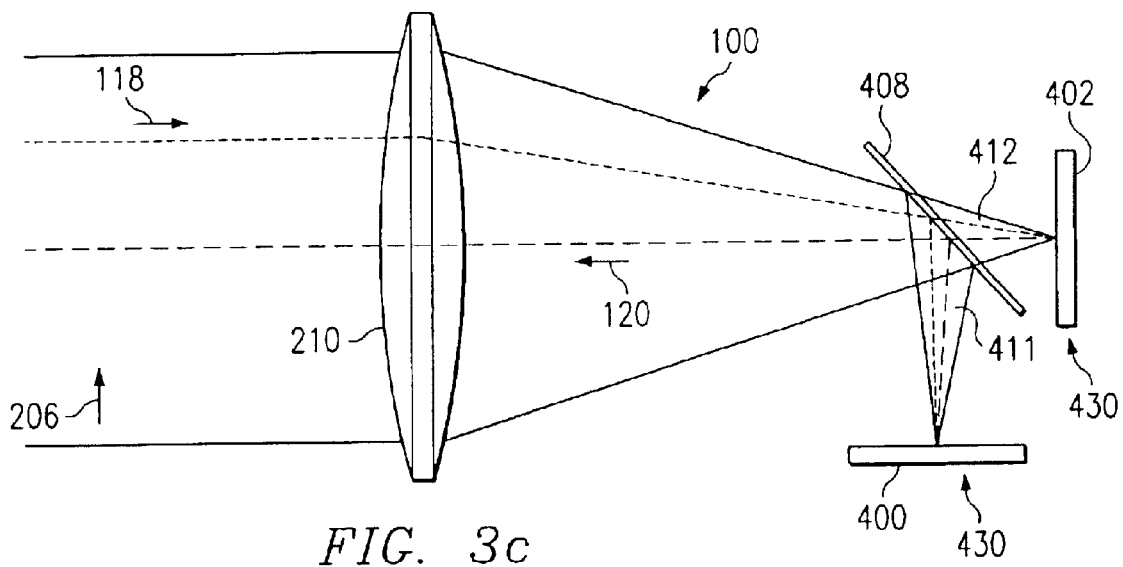

According to teachings of the invention, boresight module 20 includes a boresight collimator 100 that includes a target plate that emits photo-luminescent energy in response to being illuminated by a beam from the laser 30, which in some embodiments allows color CCD camera 40 to be aligned using a laser, without a NIR camera. FIG. 2 describes additional details of an example of boresight module 20. FIGS. 3A through 3C describe example embodiments of boresight collimator 100.

FIG. 2 illustrates details of a boresight module 220 in accordance with one embodiment of the present invention. Boresight module 20 includes boresight collimator 100, reflectors and beamsplitters 110, a relay tube 112, a boresight chassis 108, a prism 114, and channels 102, 104, and 106. Boresight collimator 100 may represent a Ritchey-Chretien collimator, a Cassegrain collimator, or any other collimator with an optical scheme that can produce a beam of parallel rays of energy. Further, boresight collimator 100 may include one or more mirrors with spider mountings or any other mountings. Beamsplitters 110 may include a beamsplitter capable of splitting infrared energy from photo-luminescent energy, a reflector plate that guides a laser beam, or any mirror or prism or a combination of the two that is used to divide energy into two or more parts.

In one particular embodiment of the present invention, channels 102, 104, and 106 are physical channels that allow energy to enter and leave boresight module 20. In the particular embodiment, channels 104 and 106 form a single physical conduit in boresight module 220 (as opposed to the embodiment illustrated in FIG. 1). Channel 102 represents a channel for receiving an energy beam from laser 30, and thereby may be referred to as laser 30 line-of-sight (LOS). Channel 104 provides a color image device 40 LOS for photo-luminescent energy emitted by boresight module 20, while channel 106 provides a FLIR sensor 50 LOS for infrared energy emitted boresight module 20.

In operation, boresight module 20 is pre-aligned such that portions of FLIR sensor 50 LOS (shown as being horizontal in FIG. 2) are made coincident with portions of laser 30 LOS (also shown as being horizontal in FIG. 2) by adjusting prism 114 (the two lines of sight are illustrated as being not coincided in FIG. 2 for clarity of illustration purposes) In one embodiment, energy from laser 30 is injected into channel 102 through prism 114. The injected energy travels through relay tube 112, as denoted by reference number 116. The energy reflects or passes through one or more reflectors and beamsplitters 110 and is focused by collimator 100 on a target 130 having target plates formed from two separate materials, as better illustrated in FIGS. 3A through 3C.

A first target plate of the two may be formed from ZnSe or another photo-luminescent material and the second target plate is formed from a target material that may emit infrared energy. In one embodiment of the present invention, the first target plate photo-luminesces in the visible spectrum and the second plate emits energy in the infrared spectrum. As described in greater detail below, in one embodiment of the present invention the first target plate has an anti-reflection coating attached thereto to allow energy in the infrared spectrum to pass through the first target plate without being attenuated. Thus the energies from both target plates may be emitted back through channels 104 and 106 into the respective sensors 40 and 50 by the beamsplitters 110 (and additional beamsplitters not explicitly shown) and may be seen by color image device 40 and FLIR sensor 50 simultaneously.

FIGS. 3A through 3C illustrate various embodiments of portions of boresight collimator 100 in accordance with various embodiments of the present invention. Illustrated in FIG. 3A is a beam 206 from laser 30, collimating optics 210, and a target 230 including a first target plate 200 and a second target plate 202. Collimating optics 210 are any lenses and/or mirrors that may direct the line of sight in an optical device and, further, may be multi-spectral refractive or reflective. In this embodiment of the present invention, first target plate 200 is adjacent second target plate 202. First target plate 200 may comprise any material operable to emit photo-luminescent energy when the first target plate 200 is illuminated by a laser beam 206, including ZnSe. Further, first target plate 200 may include, or have attached thereto, an anti-reflection coating and be further operable to transmit infrared energy. Second target plate 202 may comprise any material operable to absorb substantially all or some of the energy it receives from laser 30 and emit infrared energy once the second target plate 202 is illuminated by the laser beam 206.

In operation, beam 206 travels towards collimating optics 210 as shown by reference number 118. Collimating optics 210 direct substantially all of laser beam 206 to first target plate 200 at 118, which is then illuminated by laser beam 206. First target plate 200 subsequently emits photo-luminescent energy towards collimating optics 210, as denoted by reference numeral 120. As described in more detail in FIG. 2, the photo-luminescent energy then travels over channel 104 to the color CCD camera 40. In this embodiment, first target plate 200 transmits energy from laser beam 206 to second target plate 202, which is then illuminated. Second target plate 202 absorbs substantially all or some of the remaining laser beam 206 and subsequently emits infrared energy towards collimating opticics 210, as shown by reference number 120. As described in more detail in FIG. 2, the infrared energy then travels over channel 106 to the FLIR sensor 50. It will be understood that reference number 120 indicates the paths of both the emitted photo-luminescent energy and the emitted infrared energy. Generally, the paths may be parallel or non-coincident, but are illustrated as being coincided for clarity of illustration purpose.

FIG. 3B illustrates an alternative embodiment of portions of boresight collimator 100. Illustrated in FIG. 3B is beam 206 from laser 30, collimating optics 210, and a target 330 including a first target plate 300 and a second target plate 302. Collimating optics 210 is described above in conjunction with FIG. 3A. In this embodiment of the present invention, first target plate 300 is not adjacent second target plate 302. Rather it is separated by a gap 304. Gap 304 may comprise any distance that allows for proper focusing of laser beam 206 on the first target plate 300 and/or the second target plate 302. Gap 304 is exaggerated for clarity. First target plate 300 may be formed in a similar manner to first target plate 200, described above. Second target plate 302 may be formed in a similar fashion to second target plate 202, described above.

In operation, laser beam 206 travels toward collimating optics 210 as shown by reference number 118. Collimating optics 210 direct substantially all of laser beam 206 to first target plate 300 at 118, which is then illuminated by the laser beam 206. First target plate 300 subsequently emits photo-luminescent energy towards collimating optics 210 as denoted by reference numeral 120. In this embodiment, first target plate 200 transmits the remaining laser beam 206 through gap 304 to second target plate 302, which is then illuminated. Second target plate 302 absorbs substantially all or some of the remaining laser beam 206 and subsequently emits infrared energy towards collimating optics 210 as denoted by reference numeral 120. In this embodiment, gap 304 may cause the paths of the emitted photo-luminescent energy and the emitted Infrared energy to be different. However, the paths are denoted as coincident by reference number 120 for clarity of illustration purpose.

FIG. 3C illustrates an alternative embodiment of portions of boresight collimator 100. Illustrated in FIG. 3C is a beam 206 from a laser 30, collimating optics 210, a target 430 including a first target plate 400 and a second target plate 402, and a beamsplitter 408. Collimating optics 210 is described above in conjunction with FIG. 3A. In this embodiment of the present invention, first target plate 400 is positioned separate from the second target plate 402. Beamsplitter 408 separates the laser beam 206 into beam portion 411 and beam portion 412, each sufficient to illuminate the first target plate 400 and to illuminate the second target plate 402, respectively.

First target plate 400 may be formed in a similar manner to first target plate 200, described above. Second target plate 402 may be formed in a similar fashion to second target plate 202, described above. It will be understood that FIG. 3C is for illustrative purposes only and beamsplitter 408, first target plate 400, and second target plate 402 may be located in any position that allows for first target plate 400 and second target plate 402 to be illuminated by beam portion 411 and 412, respectively.

In operation, laser beam 206 travels towards collimating optics 210 as shown by reference number 118. The collimating optics 210 direct substantially all of the laser beam 206 to beamsplitter 408. Beamsplitter 408 separates the laser beam 206 into beam portions 411 and 412. Beam portion 411 is directed towards and targets first target plate 400. First target plate 400 may absorb substantially all or some of beam portion 411 and subsequently emits photo-luminescent energy towards beamsplitter 408. Beamsplitter 408 directs the emitted photo-luminescent energy to collimating optics 210 as also shown by reference number 120. Beamsplitter 408 further transmits the beam portion 412 to second target plate 402, which is then illuminated. Second target plate 402 may absorb substantially all or some of beam portion 412 and subsequently emit infrared energy towards beamsplitter 408. Beamsplitter 408 directs the emitted infrared energy to collimating optics 210 as also shown by reference number 120. In this embodiment, the paths of the emitted photo-luminescent energy and the emitted infrared energy may be different. However, the paths are denoted as coincident by reference number 120 for clarity of illustration purpose.

Figure 4:
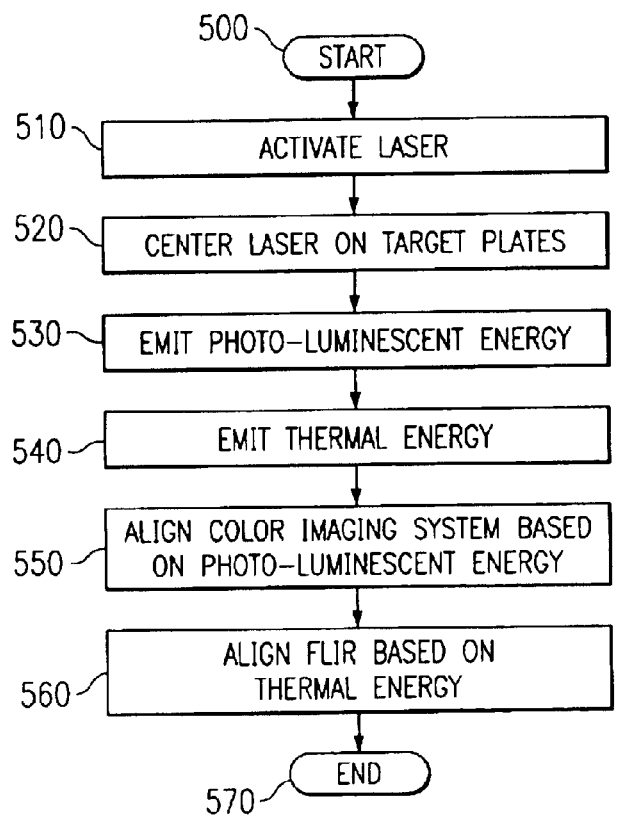
FIG. 4 is a flow chart of a method for optical alignment of the color imaging system of FIG. 1 in accordance with one embodiment of the present invention.

FIG. 4 is a flow diagram of a method for optical alignment of a color charge-coupled device (CCD) camera in accordance with one embodiment of the present invention. Some or many of these steps can be omitted without departing from the scope of the invention. In addition, various steps might be repeated with different frequency. Nothing in the description of FIG. 4 is intended to limit in any way the potential uses of the invention or the options as far as construction. The method begins at step 500.

In step 510, a laser is activated and a beam from the laser is transmitted. Next, in step 520, the laser is centered on a pair of target plates. A first target plate of the pair may be comprised of any material operable to emit photo-luminescent energy when the first target plate is illuminated by the laser beam. Further, the first target plate may be anti-reflection coated and operable to transmit energy. A second target plate of the pair may be comprised of any material operable to absorb substantially all or some of the laser and emit infrared energy once illuminated by the laser beam. The first target plate may emit photo-luminescent energy at step 530. The emitted photo-luminescent energy travels through one or more beamsplitters and is directed to a color imaging system. In step 540, the second target plate may emit infrared energy once illuminated by the laser beam. The emitted infrared energy travels through one or more beamsplitters and is directed to a FLIR sensor. Next, the color imaging system may be aligned based on the detected photo-luminescent energy at step 550. Then, at step 560, a FLIR system may be aligned based on the detected infrared energy. The method concludes at step 570.

Although the present invention has been described in detail, it should be understood that various changes, substitutions and alterations can be made hereto without departing from the sphere and scope of the invention as defined by the appended claims.

What is claimed is:

1. A method comprising:
   illuminating a target part with a laser beam, said target part including zinc selenide which emits visible radiation in response to said laser beam;
   detecting said visible radiation with a visible radiation detector; and
   effecting an alignment operation of said visible radiation detector in relation to said laser beam as a function of said visible radiation detected by said visible radiation detector.

2. A method according to claim 1, including selecting a color charge coupled device to serve as said visible radiation detector.

3. A method according to claim 1, including providing an anti-reflection coating on said target part.

4. A method according to claim 1, including selecting said laser beam to include infrared radiation.

5. A method according to claim 1, including:
   illuminating a further target part with said laser beam, said further target part emitting infrared radiation in response to said laser beam;
   detecting said infrared radiation with an infrared radiation detector; and
   effecting an alignment operation of said infrared radiation detector in relation to said laser beam as a function of said infrared radiation detected by said infrared radiation detector.

6. A method according to claim 5, wherein said illuminating of said target parts is carried out by illuminating each of said target parts at the same time.

7. A method according to claim 6, including positioning said target parts so that said laser beam passes through said target part with zinc selenide in order to reach said further target part.

8. A method according to claim 7, wherein said positioning of said target parts includes positioning said target parts adjacent each other.

9. A method according to claim 7, wherein said positioning of said target parts includes positioning said target parts with a gap therebetween.

10. A method according to claim 6, including passing said laser beam through a beam splitter to produce first and second portions of said laser beam which each illuminate a respective said target part.

11. A method according to claim 6, including:

passing said laser beam successively through a prism and a beam splitter before said laser beam reaches said target parts; and causing said beam splitter to reflect said visible radiation and said infrared radiation along a path toward said detectors.

12. A method according to claim 11, including passing said laser beam, said visible radiation and said infrared radiation through collimating optics disposed optically between said beam splitter and said target parts.

13. An apparatus comprising:

a laser beam generator for generating a laser beam;

a target part positioned to be illuminated by said laser beam, said target part including zinc selenide which emits visible radiation in response to said laser beam; and a visible radiation detector which can detect said visible radiation to facilitate an alignment operation of said visible radiation detector in relation to said laser beam.

14. An apparatus according to claim 13, wherein said visible radiation detector includes a color charge coupled device.

15. An apparatus according to claim 13, including an anti-reflection coating on said target part.

16. An apparatus according to claim 13, wherein said zinc selenide of said target part emits said visible radiation when said laser beam is an infrared laser beam.

17. An apparatus according to claim 13, including:

a further target part positioned to be illuminated by said laser beam, said further target part emitting infrared radiation in response to said laser beam; and an infrared radiation detector which can detect said infrared radiation to facilitate an alignment operation of said infrared radiation detector in relation to said laser beam.

18. An apparatus according to claim 17, wherein said laser beam illuminates said target parts at the same time.

19. An apparatus according to claim 18, wherein said target parts are positioned so that said laser beam passes through said target part with zinc selenide in order to reach said further target part.

20. An apparatus according to claim 19, wherein said target parts are positioned adjacent each other.

21. An apparatus according to claim 19, wherein target parts are positioned with a gap therebetween.

22. An apparatus according to claim 18, including a beam splitter which is disposed in the path of said laser beam and which splits said laser beam into first and second portions that each illuminate a respective said target part.

23. An apparatus according to claim 18, including a prism and a beam splitter through which said laser beam passes before reaching said target parts, and which reflects said visible radiation and said infrared radiation along a path toward said detectors.

24. An apparatus according to claim 23, including collimating optics disposed optically between said beam splitter and said target parts in a manner so that said laser beam, said visible radiation and said infrared radiation pass through collimating optics.

25. An apparatus comprising:

a first target part positioned to be illuminated by a laser beam, said first target part including zinc selenide which emits visible radiation in response to said laser beam;

a second target part positioned to be illuminated by said laser beam, said second target part emitting infrared radiation in response to said laser beam.

26. An apparatus according to claim 25, wherein said first target part has an anti-reflection coating thereon.

27. An apparatus according to claim 25, wherein said laser beam includes infrared radiation.

28. An apparatus according to claim 25, wherein said target parts are positioned to be illuminated by said laser beam at the same time, so that said visible radiation and said infrared radiation are emitted at the same time.

29. An apparatus according to claim 28, wherein said target parts are positioned so that said laser beam passes through said first target part in order to reach said second target part.

30. An apparatus according to claim 29, wherein said first and second target parts are positioned adjacent each other.

31. An apparatus according to claim 29, wherein said first and second target parts are positioned with a gap therebetween.

32. An apparatus according to claim 28, including a beam splitter through which said laser beam is passed to produce first and second portions of said laser beam which respectively illuminate said first and second target parts.

33. An apparatus according to claim 28, including a prism and a beam splitter through which said laser beam passes before reaching said target parts, said beam splitter reflecting said visible radiation and said infrared radiation along a predetermined path.

34. An apparatus according to claim 33, including collimating optics disposed optically between said beam splitter and said target parts, said laser beam, said visible radiation and said infrared radiation passing through collimating optics.

* * * * *

UNITED STATES PATENT AND TRADEMARK OFFICE
CERTIFICATE OF CORRECTION

PATENT NO. : 6,747,256 B1
DATED : June 8, 2004
INVENTOR(S) : John Anthony Tejada et al.

It is certified that error appears in the above-identified patent and that said Letters Patent is hereby corrected as shown below:

Column 2,
Line 23, after "Fig. 2 illustrates the" delete "Foresight" and insert -- boresight --.

Column 3,
Line 56, after "illustration purposes" delete ")" and insert -- . --.

Column 4,
Line 46, after "collimating" delete "opticics" and insert -- optics --.

Column 5,
Line 17, after "and the emitted" delete "Infrared" and insert -- infrared --.

Signed and Sealed this

Fifth Day of July, 2005

JON W. DUDAS
*Director of the United States Patent and Trademark Office*